US006971410B2

(12) United States Patent
Sari et al.

(10) Patent No.: US 6,971,410 B2
(45) Date of Patent: Dec. 6, 2005

(54) PORTABLE DRUM DOSING SYSTEM

(75) Inventors: John Paul Sari, Berlin, NJ (US); Geoffrey Richard Koontz, Malvern, PA (US)

(73) Assignee: Rohm and Haas Company, Exton, PA (US)

( * ) Notice: Subject to any disclaimer, the term of this patent is extended or adjusted under 35 U.S.C. 154(b) by 253 days.

(21) Appl. No.: 10/643,833

(22) Filed: Aug. 19, 2003
(Under 37 CFR 1.47)

(65) Prior Publication Data
US 2005/0081932 A1  Apr. 21, 2005

Related U.S. Application Data

(60) Provisional application No. 60/404,560, filed on Aug. 20, 2002.

(51) Int. Cl.[7] ............................ A25G 25/09; B60P 3/00
(52) U.S. Cl. ................. 137/899; 137/565.01; 137/590; 414/619; 414/622; 414/673
(58) Field of Search ............................. 137/899, 899.4, 137/590, 565.01; 414/619, 622, 673

(56) References Cited

U.S. PATENT DOCUMENTS

| | | | |
|---|---|---|---|
| 1,650,210 A | | 11/1927 | Hasty |
| 2,855,759 A | * | 10/1958 | Chaiser ............................ 62/7 |
| RE33,945 E | * | 6/1992 | Beaty ........................ 141/388 |
| 5,406,996 A | | 4/1995 | Wagner et al. |
| 5,618,154 A | | 4/1997 | Irons, Jr. et al. |

FOREIGN PATENT DOCUMENTS

FR            723378          4/1932

* cited by examiner

Primary Examiner—A. Michael Chambers
(74) Attorney, Agent, or Firm—Thomas D. Rogerson

(57) ABSTRACT

A portable drum dosing system includes an outer mast assembly extending generally horizontally from the main frame and includes a pair of legs disposed at an angle with respect to each other so that the legs may straddle and dispose the main frame near a drum. An upstanding post assembly extends upwardly from the main frame at the outer mast assembly. The post assembly includes a fixed guide post. An upper clamping mechanism is movably mounted to the fixed post for engaging the chime of a drum. A lifting mechanism controls the vertical movement of the upper clamping mechanism and of the stabilizing mechanism to permit a drum to be engaged by the transporter and then lifted and then conveyed from one location to another. An optional weight measuring device is movably mounted to the fixed post to permit the weight of the drum to be accurately determined. A pump mechanism comprising a pump, a dip tube attached to the input side of the pump and a discharge line attached to the output side of the pump is demountably mounted to the clamping mechanism or the drum or moveably mounted to the fixed post or mounted to the main frame. The main frame optionally comprises counter-balance means to minimize a tendency of the transporter to tip during the handling of the drum.

9 Claims, 4 Drawing Sheets

PORTABLE DRUM DOSING SYSTEM

CROSS REFERENCE TO RELATED PATENT APPLICATIONS

This is a non-provisional application of prior pending U.S. provisional application Ser. No. 60/404,560 filed Aug. 20, 2002.

Various devices exist for transporting drums from one location to another. At times the drums are stored on a pallet or may be stored on the floor or other surface. The known form of devices generally includes a clamping mechanism which would engage the chime of a drum and also includes elements for contacting the drum below the clamping mechanism to stabilize the drum when it is lifted. Examples of commercial drum handling equipment include the DCMJ and DCM models of Liftomatic Material Handling, Inc. and the Roboter drum carrier of Osaka Taiyu Co., Ltd. The DCMJ and DCM models are attachments to a forklift. The Roboter drum carrier is a self-contained unit, but is constructed in a manner that it includes legs which are dimensioned and spaced with respect to each other whereby the legs could not conveniently straddle a pallet. U.S. Pat. No. 5,618,154 describes a drum transporter particularly useful for moving any size drum on or off pallets, scales, or containment pallets and move them around a plant.

Each of these types of drum transporters accomplishes the task for which it was designed. That is, moving a drum from one location to another; typically from a storage location to a location where the contents of the drum is removed. One problem that these drum transporters do not address, however, is a quick and simple mechanism for removing the contents of the drum in an accurate, measurable and safe manner, particularly when it is desired to move the drum from one location to another without repeatedly attaching and removing the drum from the drum transporter. Standard practice is to either place the drum on a scale and pump or pour out the contents while measuring the weight change, to utilize a metering pump to measure the volume removed, or to pump or pour the contents of the drum into a calibrated measuring container. Each of these procedures require manipulation of the drum beyond just moving it and can result in exposure of the operator to the drum contents. This is particularly of concern when the drum contents is a hazardous material.

We have discovered an improvement to the drum transporter of U.S. Pat. No. 5,618,154 which allows for the safe and convenient transport of a drum and the safe, accurate, and measurable removal of the drum contents while at the same time eliminating much of the potential for operator exposure to the contents that occurs when the drum is attached to or removed from the drum transporter or the material contents of the drum are discharged into another container or processing equipment. The portable drum dosing system of this invention includes a drum transporter comprising a main frame mounted on wheels. An outer mast assembly extends generally horizontally from the main frame and includes a pair of legs disposed at an angle with respect to each other so that the legs may straddle a drum. An upstanding post assembly extends upwardly from the main frame at the outer mast assembly. The post assembly includes a fixed guide post. An upper clamping mechanism is movably mounted to the fixed post for engaging the chime of a drum. Preferably, a stabilizing mechanism is movably mounted to the fixed post below the clamping mechanism for contacting the drum at a location below the clamping mechanism. A lifting mechanism controls the vertical movement of the upper clamping mechanism and of the stabilizing mechanism, if present, to permit a drum to be engaged by the transporter and then lifted and then conveyed from one location to another. A weight measuring device is movably mounted to the fixed post to permit the weight of the drum to be accurately determined. A pump mechanism comprising a pump, a dip tube attached to the input side of the pump and a discharge line attached to the output side of the pump is mounted to the clamping mechanism or the drum or moveably mounted to the fixed post or mounted to the main frame. Optionally, the main frame comprises counter-balance means to minimize a tendency of the transporter to tip during the handling of the drum.

The main frame may include a compartment which can be exposed by selective detachment of a covering plate so that weights could be mounted in the compartment to assure its counter-balancing function. An outer sleeve assembly may be movably mounted to the fixed guide post with the clamping mechanism, the stabilizing mechanism, the weighing mechanism, and, optionally, the pump attached to the outer sleeve assembly. The lifting mechanism is also attached to the outer sleeve assembly whereby actuating of the lifting mechanism causes the outer sleeve to move up or down. The pump itself may be mounted in a fixed or movable manner to any convenient point on the system of this invention so long as operation of the pump does not interfere with the operation of the weight measuring device.

A BRIEF DESCRIPTION OF THE DRAWINGS

The present invention provides, therefore, a self-contained portable drum dosing system, comprising:

a) a main frame, the main frame comprising a loading end and a steering end remote from the loading end, a set of wheels mounted to and below the main frame for facilitating the movement of the main frame from one location to another, and the main frame optionally comprising counterbalance means including weights to minimize any tendency of the transporter to tip during the handling of a drum;

b) an outer mast assembly extending generally horizontally from the main frame at the loading end, the outer mast assembly comprising a pair of legs at the loading end, each of the legs having a longitudinal centerline, extensions of the longitudinal centerlines intersecting generally at the post assembly to form an angle between the legs such that a generally V-shaped spacing between the legs is formed at the loading end, the angle being sufficient respect to the legs to permit the legs to dispose the main frame near a drum;

c) an upstanding post assembly extending upwardly from the main frame at the outer mast assembly, the post assembly comprising:
i) a fixed guide post,
ii) an upper clamping mechanism for releasably engaging the chime of a drum, the upper clamping mechanism being movably mounted to the fixed guide post and being disposed in the spacing between the legs for selective vertical movement up and down with respect to the fixed guide post, iii) optionally, a stabilizing mechanism for contacting the drum at a location below and remote from the upper clamping mechanism, the stabilizing mechanism being movably mounted to the fixed guide post and being disposed in the spacing between the legs for selective vertical movement up and down with respect to the fixed guide post, the spacing being free of any structure outwardly of the upper clamping mechanism and the stabilizing mechanism, d) optionally, a weight measuring device movably mounted to the fixed post such that a change in the weight of the drum contents may be determined;

e) a pump mechanism comprising a pump, a dip tube attached to the input side of the pump and a discharge line attached to the output side of the pump demountably mounted to the clamping mechanism, demountably mounted to the drum, moveably mounted to the fixed post, or mounted to the main frame; and f) a lifting mechanism selectively controlling the vertical movement of the upper clamping mechanism and of the optional stabilizing mechanism to thereby permit a drum on a pallet to be engaged by the system and then be conveyed from one location to another.

Figure 1:
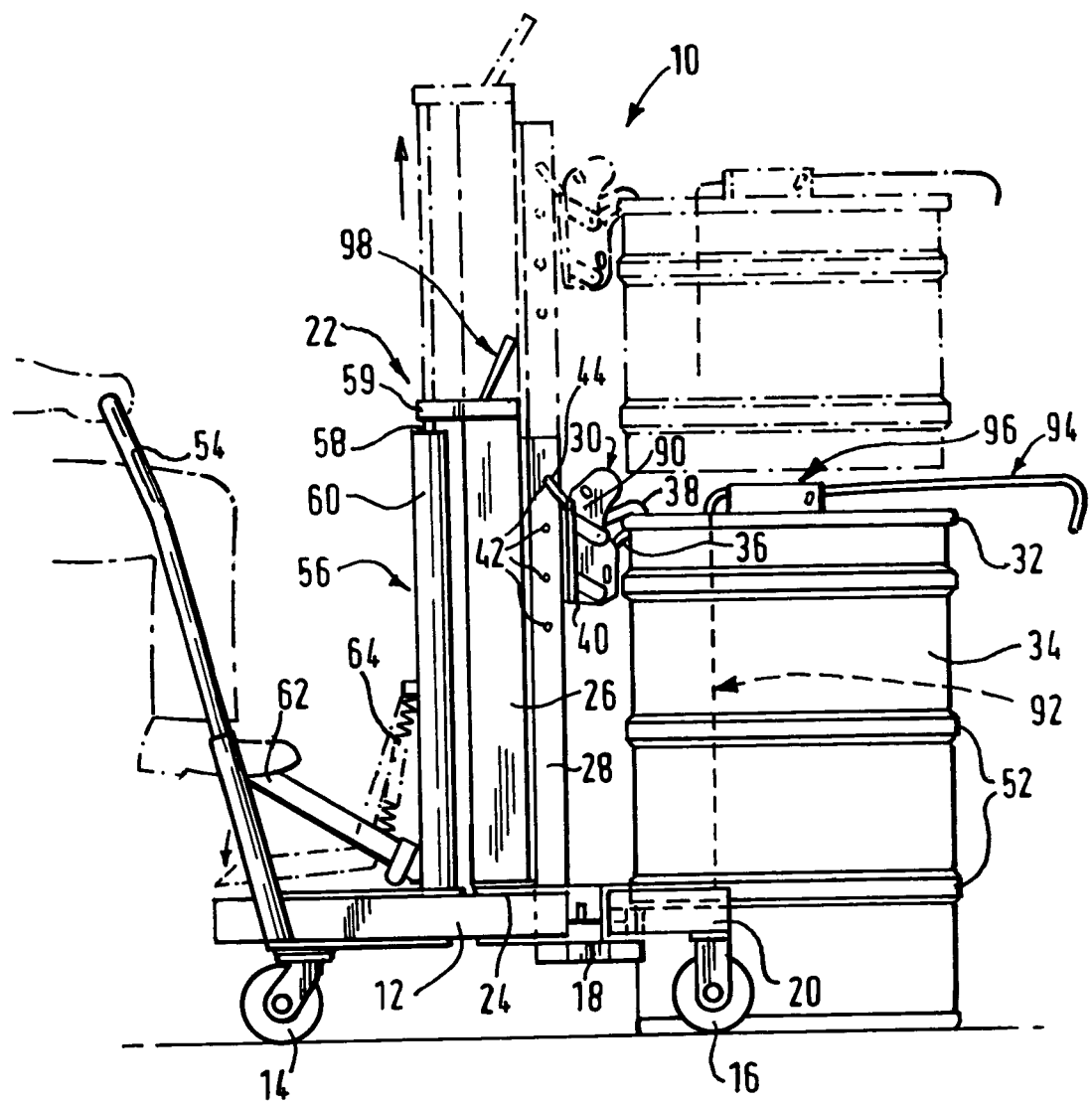
FIG. 1 is a side elevational view of a drum transporter in accordance with one embodiment of this invention.
Figure 2:
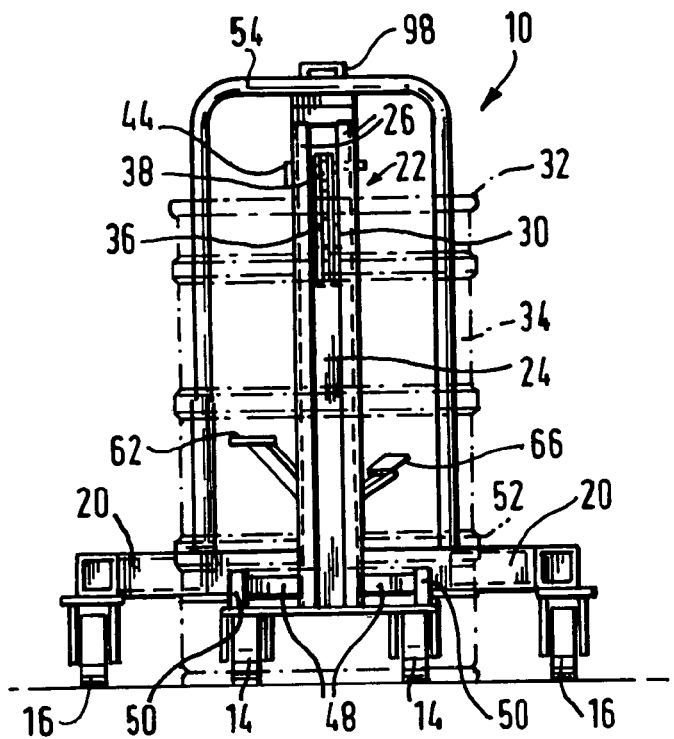
FIG. 2 is a side elevational view of the transporter shown in FIG. 1.
Figure 3:
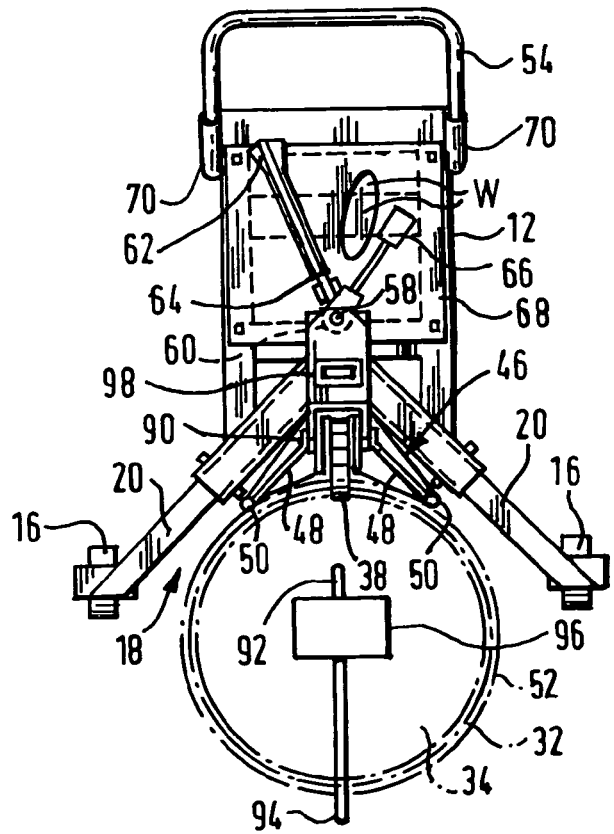
FIG. 3 is a top plan view of the transporter shown in FIG. 1–2.

FIGS. 1–3 illustrate a portable drum dosing system 10 in accordance with one embodiment of this invention. As shown therein system 10 includes a main frame 12 mounted on sets of wheels 14, 16. Rear wheels 16 are pivotally mounted below and to main frame 12 to facilitate the steering of the system 10. Wheels 16 are mounted below and to an outer mast assembly 18 which extends horizontally outwardly from the main frame 12. The forward wheels 16 may be pivotally mounted but are preferably fixed or non-pivotally mounted. Wheels 16 are preferably 5 inch solid kryptonic chemical resistant wheels with precision sealed ball bearings to provide easy rolling.

As shown in FIG. 2 the outer mast assembly 18 includes a pair of straddle legs 20 which are disposed at a 90.degree angle with respect to each other so that the legs may conveniently straddle the corner of a pallet. Accordingly, the spacing should be at least 90 degrees with respect to each other. As the angle decreases below 90 degrees, it is more difficult to straddle the pallet. As the angle increases beyond 90 degrees however more room will be required to accommodate the legs.

System 10 also includes an upstanding post assembly 22 which includes a fixed guide post 24. A sleeve assembly is mounted around fixed post 24. The sleeve assembly is formed as two C-shaped members 26, 26 or as a cylinder surrounding the fixed guide post 24. As shown in FIG. 1, each sleeve 26 includes an extension member 28 to which an upper clamping mechanism 30 is detachably secured. Upper clamping mechanism 30 may be of any suitable construction capable of engaging the chime 32 of a drum 34. The invention may be practiced, for example, by using a "Parrot-Beak" type clamping mechanism manufactured by Liftomatic Material Handling, Inc. or by Morse Manufacturing Co. or by Kriegler Manufacturing Co. The clamping mechanism 30 includes a lower jaw 36 and a movable upper jaw 38 attached to a body structure 40. Extension members 28, 28 are provided with sets of aligned holes 42 to permit vertical adjustment of the location of mounting of clamp mechanism 30. Thus, as shown in FIGS. 1 and 2 a retainer pin 44 extends through a set of holes 42 and through clamp mechanism 30 to mount the clamp mechanism 30 to the sleeve 26. When it is desired to change the location of mounting, the retainer pin 44 is removed to permit the clamp mechanism 30 to be re-positioned and then re-attached to sleeves 26 by again inserting pin 44 through the appropriate set of holes 42 and the corresponding hole in clamp mechanism 30.

As shown in FIG. 1, System 10 includes optional weighing mechanism 90 incorporated into the clamp mechanism body structure 40. Operably attached to weighing mechanism 40 is weight readout mechanism 98. Dip tube 92 extends from pump 96 to the bottom of drum 34. Discharge line 94 extends from pump 96.

As best shown in FIG. 3, the optional stabilizing mechanism 46 is mounted to sleeve 26. Stabilizing mechanism 46 includes a pair of horizontal arms 48 having vertically disposed pins 50 at their outer end for engagement under the annular ring 52 of drum 34.

In operation the user would grasp handle 54 at the rear end of main frame 12 and steer the transporter 10 to the barrel which is intended to be moved. If the barrel is on a pallet, as in FIGS. 4–5, the user would steer transporter 10 so that the legs 20,20 straddle the pallet. When positioning the transporter 10 the user would dispose the pins 50 under ring 52. Clamp mechanism 30 would be mounted to sleeves 26 at the proper location for engagement with chime 32. The engagement would be accomplished by disposing jaw 36 beneath chime 32 and then actuating movable jaw 38 in a known manner to engage the drum. The user then actuates a lifting mechanism 56 which is mounted to sleeve 26 for raising the sleeve 26 and thereby also raising the clamping mechanism 30 and the stabilizing mechanism 46. Because the drum is clamped by clamping mechanism 30 the drum 34 is also elevated. FIG. 1, for example, illustrates in solid lines, the initial engagement of transporter 10 with drum 34 while the drum is in its lowest position. FIG. 1 also illustrates in phantom, the corresponding components when the drum 34 is elevated.

Any suitable lifting mechanism may be used in accordance with this invention such as, for example, an air cylinder, a pneumatic device, a hydraulic device, an electric device, a mechanical device, or a combination of two or more such devices. In general, the lifting mechanism would incorporate a pair of telescopic members with some means to cause movement of the inner member and the outer tubular member with respect to each other and to transmit this up and down movement to the sleeve assembly 26 to thereby effect a corresponding vertical movement of the sleeves 26. If desired, the members need not be telescopically mounted. Rather the members could simply be slidably mounted against each other. The lifting mechanism may also be in the form of a scissors jack or its equivalent.

FIG. 1 illustrates the members to be in the form of a hydraulic cylinder 60 having a piston 58 extending out of cylinder 60. A bracket 59 connects piston 58 to sleeves 26. A suitable hydraulic cylinder could be used such as the Star Hydraulic Foot Operated Lift Model HF500 from Star Hydraulics, Inc. The illustrated lift mechanism 56 also includes a foot operated lever 62 which is pumped to supply hydraulic fluid and thereby elevate piston 58 from cylinder 60. A return spring 64 is mounted between lever 62 and cylinder 60. As shown in FIGS. 2–3 a foot operated pedal 66 is also provided to actuate a release valve and permit the fluid to be returned so that the piston 58 may again be lowered into cylinder 60.

The optional weight measuring device 90 may be mounted to the system 10 at a location and in a manner such that as the contents of the drum 34 are removed, the weight change is accurately measured. Typically, the weight measuring device 90 is mounted on the clamping mechanism, the extension members 28, or at another point, for example, on the lifting mechanism. Changes in the weight of the drum and its contents are registered on the readout device 98 operably attached to the weight measuring device 90, for example, electrically or mechanically. Typical readout devices include, for example, meters, gauges, CRT screens, digital or analog devices, and printers. Such devices may be calibrated or adjusted to give an instant or cumulative readout of the amount of material remaining in the drum or discharged from the drum. Typical weight measuring devices include, for example, electromechanical scales, load cells, and mechanical scales. In operation, the user would zero the weight measuring device either before or after clamping the drum to the System. As the drum contents are discharged the weight change may be accurately determined and the amount of material discharged from the drum calculated. Optionally, the weight measuring device or the weight readout mechanism may incorporate a microprocessor, calculator, or other device to convert the change in weight, that is, the weight of the drum contents discharged, to the volume discharged by taking into account the density of the drum contents. Optionally, the weight measuring device and the pump mechanism may be interconnected such that a predetermined amount of material can be pumped from the drum. Optionally, the weight measuring device and the optional valves may also be interconnected to allow for automated operation of the valves. The weight measuring device, pump mechanism, and valves may all be interconnected. The System 10 may also include a drum venting means. Such means can be a part of or interconnected with the dip tube 92, pump mechanism 96, or discharge line 94 or comprise a separate component of the system. The weight measuring device may comprise an indirect weight measuring means such as a volume measuring device such as, for example, a flow meter, mass meter, mag meter, or rotometer, with or without a flow totalizer. Utilizing such an indirect weight measuring device determines weight based upon the amount of material discharged. Preferably, system 10 includes weight measuring device 90. Most preferably, the weight measuring device is calibrated to provide a direct readout of either the amount of drum contents discharged or the amount of drum contents remaining in the drum.

Figure 4:
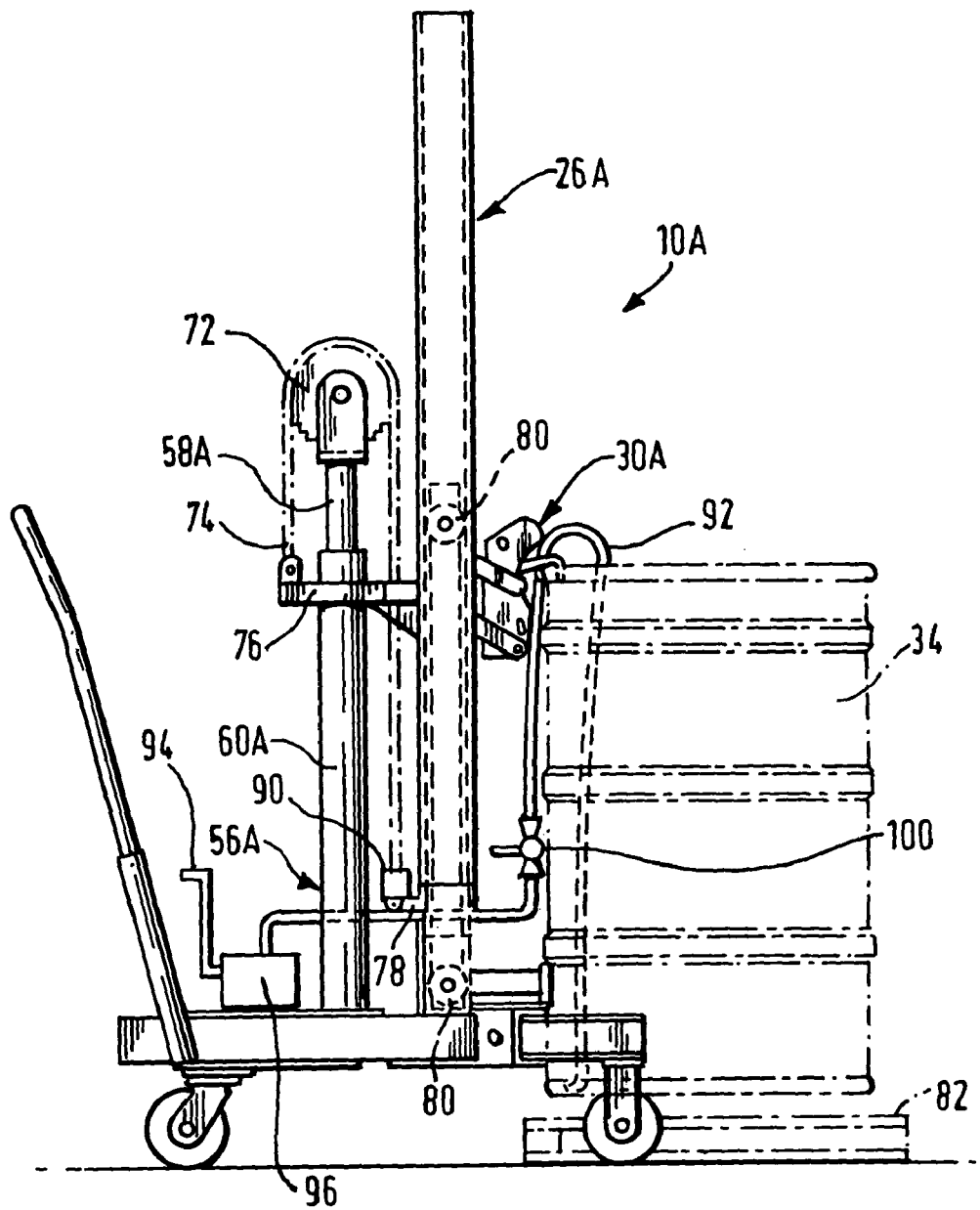
FIG. 4 is a side elevational view of a modified form of transporter in accordance with this invention.
Figure 5:
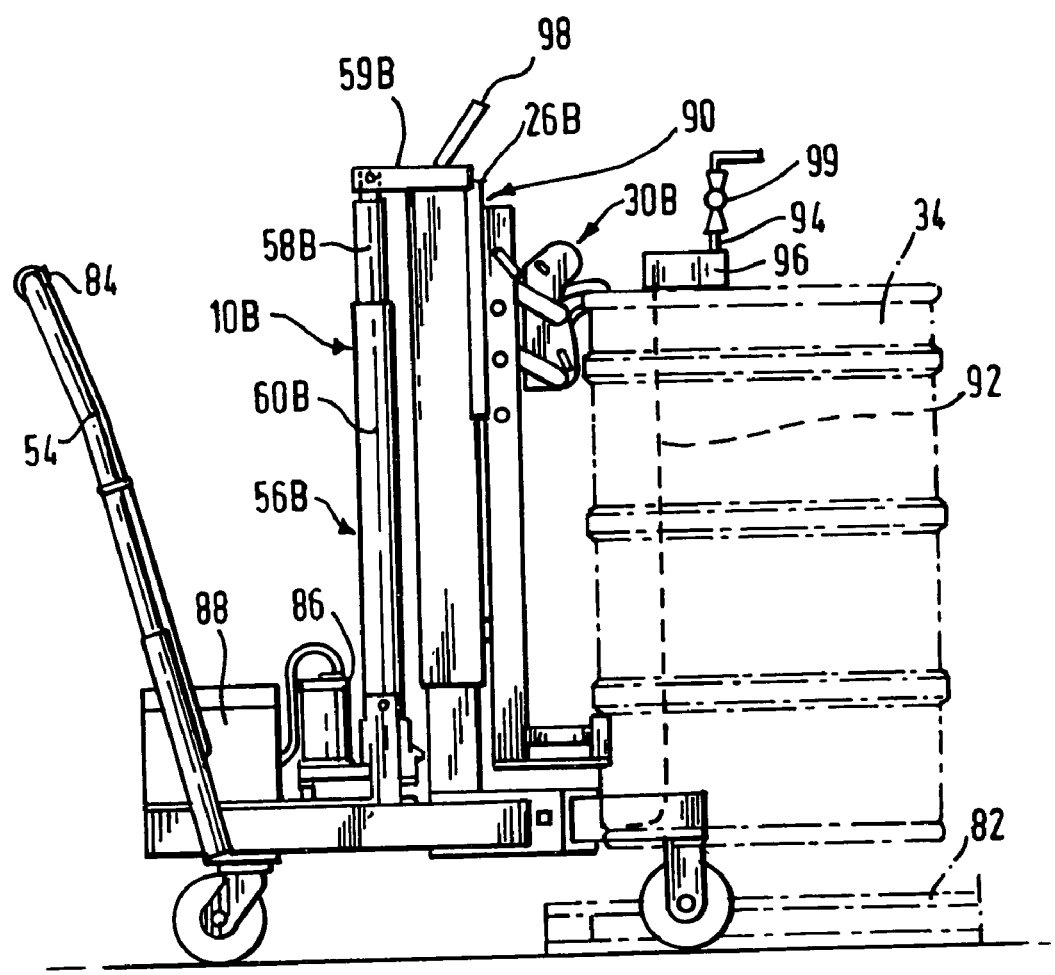
FIG. 5 is a side elevational view of yet another form of transporter in accordance with this invention.

The pump mechanism comprises a pump 96 such as, for example, a gear, centrifugal, piston, vane, peristaltic, metering, or diaphragm pump, a dip tube 92 connected to the pump, and a discharge tube 94 connected to the pump. The dip tube and the discharge tube independently may be rigid or flexible tubing or pipe. In practice, the dip tube is extended to the bottom of the drum through a preexisting opening in the top or by piercing the top of the drum. The dip tube may be in the form of a lance. Optionally, the dip tube may be retractable into an outer sleeve or tube to isolate the dip tube from the operator such as, for example, the protective sleeves utilized in the "Drumvent™" system (Container Technology). The outer sleeve may incorporate a rinsing means to clean any residual drum contents from the dip tube. Preferably, the dip tube is incorporated into a containment sleeve to provide a fully closed system. The discharge tube 94 extends in such a manner as to allow the drum contents to be pumped into another container or into a process apparatus. Optionally, the discharge tube may include one or more valves 99, tees 100, or both, as illustrated in FIG. 5. The dip tube may optionally include one or more valves and tees to allow for filling or rinsing the inside of the drum while bypassing the pump 96. The dip tube and the discharge tube independently may incorporate one or more quick disconnect fittings, including dripless or dry break disconnects. The pump may be mounted at any location on the System 10, provided that the position does not interfere with the operation of the lifting mechanism or the accurate determination of the weight of the drum content that has been discharged. FIG. 4 shows pump 96 mounted on the main frame. The pump may be permanently attached to the system or moveably or demountably attached at any point. Preferably, the pump is attached to the mainframe.

One optional feature of system 10 is that main frame 12 may be made of heavy duty material to function as counterbalance means and to minimize any tendency for transporter 10 to tip when it is lifting a drum and when it is moving the drum from one location to another. If necessary, the main frame 12 could be made heavier by the addition of weights on the side of the main frame opposite legs 20, 20. FIG. 3, for example, illustrates main frame 12 to include a top plate 68 which is detachably secured by fasteners 70 to permit the top plate 68 to be removed and thereby expose the interior of main frame 12. Removable weights W could be inserted into or removed from the interior to adjust the total weight of the main frame in accordance with the counter-balance force necessary. The heavier the main frame, the less likely would there be any tendency to tip. On the other hand, the heavier the main frame, the more difficult it is to push the System. Accordingly, the option of adjusting the total weight permits the proper balance necessary to minimize tipping while facilitating the movability of System 10. Capacity of System 10 is adjusted by extending or shortening of the legs 20. This is accomplished by forming legs 20 of telescopic members as shown in FIG. 3. Adjusting the length of legs 20 thus also functions to provide counterbalancing.

FIG. 4 illustrates a modified transporter 10A using an alternative lifting assembly 56A. As shown therein, a sprocket 72 is mounted to the exposed top end of piston 58A. A chain 74 is secured at one end to bracket 76 on cylinder 60A while the other end of the chain 74 is secured to weight measuring device 90 which is then secured to bracket 78 mounted to the sleeves 26A and thereby facilitate the up and down movement of sleeves 26A. This differs from the System 10 where the upper end of piston 58 is secured directly to the sleeve 26 by the connecting bracket 59. FIG. 4 also illustrates alternative, and preferable, mounting of pump 96 to the main frame. FIG. 4 also illustrates the inclusion of rollers 80 within the sleeve 26A to facilitate the up and down movement. FIG. 4 also illustrates upper clamping mechanism 30A.

FIG. 1 shows the drum 34 to be mounted directly on a floor. FIG. 4, however, illustrates the drum 34 to be mounted on a pallet 82.

FIG. 5 illustrates a transporter 10B utilizing an electronic lifting mechanism 56B. As shown therein an screw actuator is mounted within outer cylinder 60B. Screw actuator may be of a known type such as a PPA Linear Actuator. Control of movement of the inner telescopic member 58B is achieved by means of a switch 84 on handle 54. Switch 84 actuates motor 86 which is powered by battery pack 88. Extension member 58B is mounted by bracket 59B to sleeves 26B for raising and lowering the sleeve.

FIG. 5 also illustrates alternate mounting of weight measuring device 90 between sleeves 26B and extension members 28.

FIG. 5 also illustrates upper clamping mechanism 30B.

In each of the embodiments, the fixed post 24 serves as a guide member to facilitate the proper vertical movement of the clamping mechanism and stabilizing mechanism.

It is to be understood that various features shown with respect to any embodiment may be used with other embodiments within the spirit of this invention.

The System of this invention provides a safe ergonomically designed manner to move any size drum on or off pallets, floors, and other locations where the drum may be located, move the drum around a plant while providing the advantage of accurately dispensing or delivering the contents of the drum to a process line or to another container in a safe manner with reduced worker exposure when compared with currently used systems. The System eliminates risks of injury normally associated with handling drums using conventional drum trucks. The System of this invention thus avoids strained backs or pinched fingers, or exposure to hazardous drum contents. The user simply need push the easy rolling System until the clamping mechanism contacts the drum. Then the user actuates the lifting mechanism to lift the drum and move the drum to its desired location where the contents can then be dispensed through the pumping mechanism. Empty drums can be refilled or safely rinsed of any residual contents through the dip tube by the use of tee connections and appropriate valves.

We claim:

1. A self-contained portable drum dosing system, comprising:
   a) a main frame, the main frame comprising a loading end and a steering end remote from the loading end, a set of wheels mounted to and below the main frame for facilitating the movement of the main frame from one location to another;
   b) an outer mast assembly extending generally horizontally from the main frame at the loading end, the outer mast assembly comprising a pair of legs at the loading end, each of the legs having a longitudinal centerline, extensions of the longitudinal centerlines intersecting generally at the post assembly to form an angle between the legs such that a generally V-shaped spacing between the legs is formed at the loading end, the angle being sufficient respect to the legs to permit the legs to dispose the main frame near a drum;
   c) an upstanding post assembly extending upwardly from the main frame at the outer mast assembly, the post assembly comprising:
      i) a fixed guide post,
      ii) an upper clamping mechanism for releasably engaging the chime of a drum, the upper clamping mechanism being movably mounted to the fixed guide post and being disposed in the spacing between the legs for selective vertical movement up and down with respect to the fixed guide post,
   d) a pump mechanism comprising a pump, a dip tube attached to the input side of the pump and a discharge line attached to the output side of the pump demountably mounted to the clamping mechanism, demountably mounted to the drum, moveably mounted to the fixed post, or mounted to the main frame; and
   e) a lifting mechanism selectively controlling the vertical movement of the upper clamping mechanism to thereby permit a drum to be engaged by the system and then be conveyed from one location to another.

2. The system of claim 1, wherein the main frame further comprises counterbalance means including weights.

3. The system of claim 2, wherein the post assembly further comprises a stabilizing mechanism for contacting the drum at a location below and remote from the upper clamping mechanism, the stabilizing mechanism being movably mounted to the fixed guide post and being disposed in the spacing between the legs for selective vertical movement up and down with respect to the fixed guide post, the spacing being free of any structure outwardly of the upper clamping mechanism and the stabilizing mechanism.

4. The system of claim 1, further comprising a weight measuring device movably mounted to the fixed post.

5. The system of claim 1 wherein the pump mechanism further comprises one or more valves incorporated into the dip tube, the discharge line, or both.

6. The system of claim 1 wherein the pump mechanism further comprises one or more tees incorporated into the dip tube.

7. The system of claim 3 wherein the post assembly includes an outer sleeve assembly movably mounted to the fixed guide post, and wherein the clamping mechanism and the stabilizing mechanism are attached to the sleeve assembly.

8. The system of claim 1 wherein the lifting mechanism comprises an outer tubular member and an inner member telescopically mounted in the outer tubular member, and the sleeve assembly being attached to one of said members.

9. The system of claim 1 wherein the weight measuring device or the weight readout device further comprises a microprocessor, a computer, or other device.

* * * * *